United States Patent [19]

Dougherty et al.

[11] 4,414,359
[45] Nov. 8, 1983

[54] DIENE-CONTAINING RUBBER COMPOSITIONS HAVING IMPROVED GREEN STRENGTH

[75] Inventors: David J. Dougherty, Akron; Binnur Günesin, Uniontown, both of Ohio; John W. Spiewak, Webster, N.Y.

[73] Assignee: The Firestone Tire & Rubber Company, Akron, Ohio

[21] Appl. No.: 342,670

[22] Filed: Jan. 25, 1982

Related U.S. Application Data

[62] Division of Ser. No. 132,736, Mar. 24, 1980, Pat. No. 4,338,425.

[51] Int. Cl.$^3$ .......................................... C08F 220/58
[52] U.S. Cl. .................................. 524/555; 525/328.2; 526/304
[58] Field of Search ............... 526/216, 217, 221, 225, 526/304; 525/343; 524/555

[56] References Cited

U.S. PATENT DOCUMENTS

| | | | |
|---|---|---|---|
| 3,037,963 | 6/1962 | Christenson | 260/72 |
| 3,079,434 | 2/1963 | Christenson et al. | 260/561 |
| 3,118,852 | 1/1964 | Christenson et al. | 260/45.2 |
| 3,247,139 | 4/1966 | Christenson et al. | 260/21 |
| 3,320,204 | 5/1967 | Blanchard et al. | 260/33.6 |
| 3,404,134 | 10/1968 | Rees | 260/78.5 |
| 3,429,952 | 2/1969 | Nordsiek et al. | 260/894 |
| 3,493,550 | 2/1970 | Schmitt et al. | 260/86.1 |
| 3,649,578 | 3/1972 | Bush et al. | 260/86.1 |
| 3,804,923 | 4/1974 | Suzuki et al. | 260/879 |
| 3,808,168 | 4/1974 | Young et al. | 260/33.4 |
| 3,832,317 | 8/1974 | Mikofalvy et al. | 260/29.6 |
| 3,950,313 | 4/1976 | Bain et al. | 260/79.5 |
| 4,205,150 | 5/1980 | Marubashi | 526/252 |
| 4,254,013 | 3/1981 | Friedman et al. | 525/209 |

FOREIGN PATENT DOCUMENTS 851045  2/1957  United Kingdom.

*Primary Examiner*—Harry Wong, Jr.
*Attorney, Agent, or Firm*—Daniel N. Hall

[57] ABSTRACT

The invention disclosed herein provides a process for preparing a diene-containing synthetic rubber having improved green strength which includes the steps of charging a reaction vessel with water, an emulsifier, an initiator, an N-(alkoxymethyl)acrylamide monomer and a monomer containing a vinyl group, purging the vessel with an inert gas, charging a diene monomer and an activator to the vessel, polymerizing the monomers to form a copolymer; and, thereafter extracting the copolymer from the vessel and any unreacted monomers. A styrene-butadiene composition containing up to about 10 percent by weight of N-(isobutoxymethyl)acrylamide exhibits better stress-strain properties than a comparable styrene-butadiene rubber without the acrylamide compound.

3 Claims, No Drawings

DIENE-CONTAINING RUBBER COMPOSITIONS HAVING IMPROVED GREEN STRENGTH

CROSS-REFERENCE TO RELATED APPLICATION

This application is a division of U.S. Ser. No. 132,736, filed Mar. 24, 1980 now U.S. Pat. No. 4,338,425.

TECHNICAL FIELD

The present invention is directed toward a process for preparing synthetic rubber such as SBR having improved green strength which involves the preparation of a copolymer comprising an acrylamide, a diene and a compound containing a vinyl group.

An important requirement for a tire body ply is that it have good green strength in order to prevent tearing or excessive sagging during the building operation as well as subsequent conveying and/or storing of the green tire. Additionally, high green strength will help to prevent cord movement during tire molding. Normal emulsion SBR containing 23% by weight bound styrene has poor green strength. Upon stretching, the material necks down rapidly and shows no strain hardening. By comparison, natural rubber strain crystallizes giving it excellent green strength. Improving the green strength of SBR can be achieved by the process of the present invention.

BACKGROUND ART

Resinous materials of N-(isobutoxymethyl)acrylamide, styrene, butadiene and an aldehyde are disclosed in U.S. Pat. Nos. 3,118,852 and 3,037,963 and can be utilized to form coating films having good flexibility, recoat adhesion as well as resistance to marring, staining, heat, detergents and corrosion. U.S. Pat. No. 3,037,963 discloses the method for making such materials in the presence of an organic solvent such as alcohol. By conducting a similar polymerization and blending the resinous material with a polymer of an aliphatic unsaturated alcohol or another resin, such as epoxide or vinyl, the composition disclosed in U.S. Pat. No. 3,118,852 is obtained with the advantage of having a lower curing temperature. Recognizing that these compositions have utility as finishes for appliances, lowering their curing temperature facilitates optimum coating. While the resistance of such coatings and their relative ease of application has significance, neither bears any relation on improving the green strength or elongation of synthetic rubber such as SBR.

U.S. Pat. No. 3,247,139 discloses an aqueous process for the preparation of aldehyde-modified carboxylic acid amide polymers in those instances where an organic solvent system is not desirable but a water base system is. Although the components of the polymers include derivatives of acrylamides and styrene and butadiene, other components are also incorporated and again there is neither a recognition nor a suggestion that an SBR having a small amount of an N-(alkoxymethyl)acrylamide would exhibit improved green strength properties.

Thus, preparation of a polymer comprising an N-(alkoxymethyl)acrylamide, a diene and a monomer containing a vinyl group as a means to improve physical properties of synthetic rubber comprising the latter two monomers such as SBR has not been disclosed in the patents of which we are aware.

DISCLOSURE OF INVENTION

It is therefore an object of the present invention to provide a process for preparing a diene-containing synthetic rubber such as SBR having improved green strength.

It is a further object of the present invention to provide a process for the preparation of copolymers comprising an N-(alkoxymethyl)acrylamide, a diene and a monomer containing a vinyl group, by emulsion polymerization.

It is yet another object of the present invention to provide a process for the synthesis of copolymers comprising an N-(alkoxymethyl)acrylamide, a diene and a monomer containing a vinyl group, which have high elongation and good ultimate tensile strength.

These and other objects, together with the advantages thereof over any known synthetic rubber compositions, which shall become apparent from the specification which follows, are accomplished by the invention as hereinafter described and claimed.

In general, the process of the present invention for preparing a diene-containing synthetic rubber having improved green strength includes the steps of charging a reaction vessel with water, an emulsifier, an initiator, an N-(alkoxymethyl)acrylamide monomer and a vinyl monomer, purging the vessel with an inert gas, charging a diene monomer and an activator to the reaction vessel and polymerizing the monomers to form an N-(alkoxymethyl)acrylamidevinyl-diene copolymer.

The copolymer of the present invention comprises from about 0.5 to about 10 percent by weight of an N-(alkoxymethyl)acrylamide, sometimes generally referred to hereinafter as an acrylamide, from about 10 to about 90 percent by weight of a diene compound and from about 1 to about 90 percent by weight of a monomer containing a vinyl group. Cast films of the copolymer have very good and unexpected stress-strain properties as compared with conventional styrene-butadiene rubbers.

PREFERRED MODE FOR CARRYING OUT THE INVENTION

The polymer composition of the present invention comprises a copolymer of an N-(alkoxymethyl)acrylamide, a diene and optionally a monomer containing a vinyl group. Suitable acrylamides having the formula

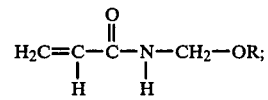

can be employed wherein R is a straight or branched alkyl chain having from 1 to about 20 carbon atoms with 3 to 8 carbon atom chains being preferred. One particularly useful acrylamide we have employed for the work reported herein is N-(isobutoxymethyl)acrylamide, hereinafter abbreviated IBMA, the R group being isobutyl.

With respect to the other monomers, those that are polymerizable in emulsion systems can be employed. Generally, diene monomers having from about four to 20 carbon atoms could be employed with butadiene or isoprene being preferred. Additionally, halogenated or other substituted emulsion polymerizable monomers could be employed. Monomers containing vinyl groups that can be employed include monovinyl aromatic compounds having from eight to about 20 carbon atoms and acrylic vinyl compounds having three to about five carbon atoms and with or without a nitrile group. Examples of the first type would include styrene and alpha-methylstyrene as well as other alkyl substituted or halogenated emulsion polymerizable monomers. In a preferred embodiment, butadiene and styrene will be selected to form the styrenebutadiene copolymer, SBR, which is, in turn, copolymerized with IBMA. Examples of the second type of vinyl compound would be acrylonitrile and methyl methacrylate. Butadiene and acrylonitrile can be employed to form a copolymer, nitrile rubber which is, in turn, copolymerized with IBMA or other acrylamide.

Regarding composition of the copolymer, the amount of acrylamide employed can range from about 0.5 to about 10 percent by weight with about 0.5 to 6 percent being preferred; the amount of diene can range from about 10 to about 90 percent by weight with about 70 to 80 percent being preferred and, the amount of the monomer containing a vinyl group can range from about 1 to about 90 percent by weight with about 20 to 30 percent being preferred. The vinyl monomer can be a monovinyl aromatic such as styrene or it can be the nitrile species as well as mixtures of the two. Number average molecular weight of the copolymers of the present invention can range from about 5,000 to about 500,000. Preferred number average molecular weight of the acrylamide-vinyl-diene copolymer can range from about 80,000 to about 150,000.

Preparation of the copolymer is via emulsion polymerization in water and an emulsifier such as sodium lauryl sulfate. A water soluble initiator is employed such as diisopropylbenzene hydroperoxide and, a molecular weight modifier, n-dodecyl mercaptan, can be added. An activator such as tetraethylenepentamine is added to the reaction vessel immediately after the diene monomer is charged.

Other emulsifiers suitable for the present invention include long chain metal sulfonates and rosin acid salts. Amounts added range from about two parts per hundred of monomer (phm) to about five phm. Initiators suitable for the present invention other than diisopropylbenzene hydroperoxide include other free radical types such as peroxides and peroxydicarbonates, benzoyl peroxide, cumene hydroperoxide and tert-butyl peroxide, and the amount employed ranges from about 0.1 phm to about 0.6 phm depending upon the desired molecular weight of the polymer product. Similarly, the activators can include $FeSO_4 \cdot 7H_2O$, alkyl amines having primary and secondary amines and sodium formaldehyde sulfoxylate in an amount of from about 0.1 phm to 0.6 phm. Other molecular weight modifiers suitable for this invention include tertiary alkyl mercaptans which are employed in amounts of from about 0.1 phm to about 0.3 phm.

Synthesis generally involves the steps of charging a reaction vessel with the water, detergent, a modifier if desired, the initiator, and the acrylamide and vinyl monomers; purging the vessel with an inert gas such as nitrogen; charging the diene monomer and activator to the vessel and polymerizing the monomers therein for a period of time of from about 12 to about 16 hours at a temperature of from about 0° C. to about 30° C. Following polymerization, the polymer product is obtained by precipitating into isopropanol.

A typical synthesis of the acrylamide copolymer of the present invention was conducted as follows: A 295 ml bottle was charged with 100.00 g of water, 2.50 g of sodium lauryl sulfate, 0.20 g of diisopropylbenzene hydroperoxide, 0.05 g of n-dodecyl mercaptan, 10.00 g of styrene and 2.00 g of N-(isobutyoxymethyl)acrylamide. The bottle was sealed with a rubber lined, three-hole crown cap and was purged with nitrogen for 15 minutes. 36.00 g of butadiene was charged followed by 0.15 g of tetraethylenepentamine. The polymerization was conducted at 5° C. for 13 hours. At the end of this time, a 60% conversion of polymer latex was obtained from the bottle after precipitating with isopropanol.

Table I reports the content and molecular weight of eight acrylamide copolymers comprising IBMA and SBR, prepared according to the foregoing synthesis. The amount of IBMA in the product varied between 0.56 and 3.7 weight percent. In these examples, the amounts of catalyst and activator were within the range of 0.1 to 0.6 phm. Monomer charges were calculated by weight percent based upon a total monomer charged of 100 percent. Amount of water was approximately 200 percent, based upon the total weight of the monomer charge.

TABLE I

| | Monomer Charges and Final Compositions of Styrene-butadiene-N—(isobutoxymethyl) acrylamide Copolymers | | | | | | | | |
|---|---|---|---|---|---|---|---|---|---|
| Ex. No. | Monomer Charge wt % | | | Conversion wt % | Time (hrs) | Final Composition wt % | | | Mn g/mole |
| | Styrene | Butadiene | IBMA | | | Styrene | Butadiene | IBMA | |
| 1 | 25.5 | 65.4 | 9.0 | 52.7 | 16 hrs. | 23.8 | 73.0 | 3.14 | 64,000 |
| 2 | 25.0 | 64.3 | 10.7 | 58.9 | 16 hrs. | 22.0 | 74.3 | 3.7 | a |
| 3 | 26.4 | 67.9 | 5.6 | 55.6 | 17 hrs. | 24.0 | 74.0 | 1.79 | 136,000 |
| 4 | 27.2 | 69.6 | 2.9 | 53.4 | 16 hrs. | 25.0 | 74.0 | 0.56 | 83,700 |
| 5 | 41.6 | 50.6 | 8.3 | 66.6 | 16 hrs. | 34.0 | 64.0 | 2.97 | a |
| 6 | 32.7 | 59.0 | 8.1 | 57.4 | 14 hrs. | a | a | 3.34 | 101,000 |
| 7 | 33.3 | 60.0 | 6.6 | 53.3 | 14 hrs. | a | a | 2.46 | a |
| 8 | 28.6 | 64.3 | 2.1 | 54.6 | 15 hrs. | a | a | 1.68 | 88,000 | a Not determined

In order to demonstrate the improvement in green strength for an SBR that results when relatively small amounts of IBMA are incorporated within the polymer structure, two IBMA-SBR copolymers, Examples 9 and 10, were prepared as set forth herein. These were compounded with 50 parts per hundred (phr) carbon black, 2.0 phr each of oil, sulfur and accelerator for comparison of stress-strain properties against a conventional SBR, Example No. 11, a high green strength emulsion SBR, Example No. 12, and natural rubber, Example 13. Example 9 was the same SBR as Example 12 but containing 5.0 weight percent IBMA; and Example 10 was the same as Example 12 containing 1.7 weight percent IBMA. Stresses at 20% elongation, at peak and at break and percent elongation at break were measured and are reported in Table II.

Gum properties of two additional IBMA-SBR copolymers, Examples 14 and 15, were compared with an identical SBR without IBMA, Example 16, and these are set forth in Table III. Tests for both tables were conducted on an Instron by securing film strips 0.03 mm thick to the heads. Head separations were 1.25 cm during testing and the strain rate was 20 min$^{-1}$.

Notwithstanding the exemplification embodied in Example Nos. 9 and 10, the IBMA-SBR copolymers of the present invention can be compounded within a broader range of ingredients which would include, from about 20 to about 80 phr of carbon black; from about 1 to about 40 phr of oil; and, from about 1 to about 10 phr each of sulfur and an accelerator.

TABLE II

Comparison of Green Stress-Strain Properties in Compounds

| Ex. No. | IBMA wt % in Polymer | Stress at 20% Elongation MPa | Stress at Peak MPa | Stress at Break MPa | % Elongation at Break |
|---|---|---|---|---|---|
| 9 | 5.0 | 0.3 | 0.6 | 1.9 | 800 |
| 10 | 1.7 | 0.25 | 0.56 | 0.9 | 1100 |
| 11 | — | 0.3 | 0.56 | 0.44 | 1000 |
| 12 | — | 0.25 | 0.46 | 0.2 | 600 |
| 13 | — | 0.2 | 0.38 | 1.7 | 950 |

TABLE III

Comparison of Stress-Strain Properties in Gum Stocks

| Ex. No. | IBMA wt % in Polymer | Stress at 20% Elongation MPa | Stress at Peak MPa | Stress at Break MPa | % Elongation at Break |
|---|---|---|---|---|---|
| 14 | 3.1 | 0.35 | 0.86 | 4.83 | 4000 |
| 15 | 0.9 | 0.14 | 0.69 | 1.21 | 4000 |
| 16 | — | 0.14 | 0.32 | 0.10 | 320 |

Judging from the results appearing in Table II, it is evident that the SBR polymer containing 5 percent by weight IBMA had improved stress-strain properties over those exhibited for the conventional SBR, Example 12, and that the stress values thereof even exceeded those possessed by the natural rubber, Example 13. Example 10, containing 1.7 percent by weight IBMA, also possessed better physical properties than Example 12 excluding stress at break.

With respect to Table III, the physical properties for a gum SBR containing IBMA at two different levels were far superior to those exhibited by a conventional SBR gum Example 16. Considering the relatively high stress at break for Example 14 coupled with the elongation at break, it is seen that as little as 3.0 percent by weight of IBMA will improve the stress-strain properties of SBR's significantly. Given the improvement in properties that are obtained when relatively low amounts of IBMA are polymerized with the SBR, it is believed that the amount of acrylamide employed need not exceed approximately 10 percent by weight.

Based upon the results presented in Tables II and III, it should be apparent that the green strength of a conventional SBR can be significantly improved by polymerizing an N-(alkoxymethyl)acrylamide such as IBMA therewith. It is to be understood that the various examples reported in Tables I–III have been provided to present results obtainable by practice of the disclosed invention. Inasmuch as we have disclosed various monomers that can be employed to practice the process of the present invention, we do not intend to limit our invention by the examples provided herein.

Thus, it can be seen that the disclosed invention carries out the objects of the invention set forth hereinabove. As will be apparent to those skilled in the art, diene-containing synthetic rubbers having improved green strength can be obtained by the process of polymerizing the monomers in the presence of one of the N-(alkoxymethyl)acrylamide monomers disclosed herein and it should be evident that the determination of particular monomers as well as the amounts thereof, can be made without departing from the spirit of the invention herein disclosed and described, and that the scope of the invention shall include all modifications and variations that fall within the scope of the attached claims.

We claim:

1. A novel synthetic rubber composition having improved green strength formed by the emulsion copolymerization, at temperatures of about 0° to 30° C., of:

from about 0.5 to about 10 percent by weight of an N-(alkoxymethyl)acrylamide having the formula

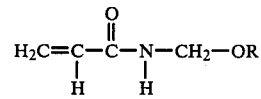

wherein R is selected from the group consisting of straight and branched alkyl chains having from 1 to about 20 carbon atoms;

from about 10 to about 90 percent by weight of a conjugated diene compound having from about four to about 20 carbon atoms; and from about 1 to about 90 percent by weight of a monomer containing a vinyl group selected from the group consisting of monovinyl aromatic compounds having from eight to about 20 carbon atoms and acrylic compounds having from three to about five carbon atoms; and, thereafter compounded with from about 20 to about 80 phr of carbon black, from about 1 to about 40 phr of oil and from about 1 to about 10 phr each of sulfur and an accelerator.

2. A novel synthetic rubber composition, as set forth in claim 1, wherein said N-(alkoxymethyl)acrylamide is N-(isobutoxymethyl)-acrylamide, said conjugated diene compound is butadiene and said monomer containing a vinyl group is styrene.

3. A novel synthetic rubber composition, as set forth in claim 2, containing about 3% by weight of N-(isobutoxymethyl)acrylamide and having a stress at break greater than 0.2 MPa and elongation at break greater than 600%.